United States Patent [19]
Bereiter et al.

[11] Patent Number: 5,917,492
[45] Date of Patent: *Jun. 29, 1999

[54] METHOD AND SYSTEM FOR DISPLAYING AN EXPANDABLE TREE STRUCTURE IN A DATA PROCESSING SYSTEM GRAPHICAL USER INTERFACE

[75] Inventors: Thomas William Bereiter; Doron Gan, both of Austin, Tex.

[73] Assignee: International Business Machines Corporation, Armonk, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/829,570

[22] Filed: Mar. 31, 1997

[51] Int. Cl.[6] ...................................................... G06F 3/14
[52] U.S. Cl. ........................... 345/357; 345/342; 345/356; 345/346
[58] Field of Search ..................................... 345/346, 356, 345/357, 969, 342

[56] References Cited

U.S. PATENT DOCUMENTS

| | | | |
|---|---|---|---|
| 4,613,946 | 9/1986 | Forman | 345/356 |
| 4,710,763 | 12/1987 | Franke et al. | 345/10 |
| 5,491,795 | 2/1996 | Beaudet et al. | 345/346 |
| 5,515,487 | 5/1996 | Beaudet et al. | 345/440 |
| 5,528,744 | 6/1996 | Vaughton | 345/342 |
| 5,546,507 | 8/1996 | Staub | 395/76 |
| 5,644,740 | 7/1997 | Kiuchi | 345/357 |
| 5,714,971 | 2/1998 | Shalit et al. | 345/340 |
| 5,724,065 | 3/1998 | Chang et al. | 345/145 X |

OTHER PUBLICATIONS

Robert Cowart, "Mastering Windows 3.1," Sybek, Special Edition, pp. 104–115, 1993.

*Primary Examiner*—Raymond J. Bayerl
*Assistant Examiner*—Chadwick A. Jackson
*Attorney, Agent, or Firm*—Jeffrey S. LaBaw; David H. Judson

[57] ABSTRACT

A method and system are disclosed for displaying a graphical representation on a display screen of a data processing system in a manner that optimizes screen "real estate" and ease of information viewing. The graphical representation may be a tree hierarchy including a plurality of expandable and collapsible nodes. The method begins as the hierarchy is displayed within a primary display window on the display screen when the user selects a node to be expanded. In response, a first display region is output within the primary display window and includes a set of one or more subnodes associated with the selected node. If a first subnode in the first display region is then selected for expansion, a second display region is then output within the first display region, and the second display region in turn includes a set of one or more subnodes of the first subnode. This generation of new "nested" display regions then continues as the user continues to explore deeper into the tree hierarchy. A given subnode display region may have one or more controls, such as a sizing button or one or more scroll bars, to facilitate display of node information within the region, and preferably each expanded node remains associated with its subnode display region using a guideline. If generation and display of a subnode display region requires additional screen space, one or more of the subnodes in the "parent" display region are re-positioned.

22 Claims, 8 Drawing Sheets

METHOD AND SYSTEM FOR DISPLAYING AN EXPANDABLE TREE STRUCTURE IN A DATA PROCESSING SYSTEM GRAPHICAL USER INTERFACE

BACKGROUND OF THE INVENTION

1. Technical Field

The present invention relates in general to a method and system for data processing and in particular to an improved method and system of user interface to a data processing system. Still more particularly, the present invention relates to an improved method and system for presentation of certain graphical information (e.g., a tree hierarchy) on a display screen.

2. Description of the Related Art

Within data processing systems, user interfaces are accomplished in a variety of ways. An increasingly common type of user interface is a graphical user interface (GUI), which provides a user with a graphical and intuitive display of information. One common example is the display of a file system "tree hierarchy" illustrating how the various directories and files are organized in a storage device in the system. Quite often, the display of a tree hierarchy uses a pair of display frames, with one frame illustrating a portion of the tree and the second frame illustrating the contents of a particular object that has been selected by the user. Because each "node" in the tree may have subnodes (so-called "children" of a parent node), the display usually includes some mechanism for "expanding" a node to show its associated subnodes, or for collapsing such a node to hide the subnodes. If a file directory tree of even moderate size is fully-expanded to show all nodes and subnodes, however, its vertical extent is far greater than can be displayed in the frame. Thus, in such displays, only a small portion of the tree is capable of being shown on the screen at any one time. This makes it much more difficult for the user to work with the tree and to understand the hierarchical relationships between the tree elements.

A similar problem exists when the tree has a large and complex horizontal, as opposed to vertical, extent. One common example would be the display of the host computer nodes of a large, distributed computer system having a number of managed computers. Such highly-distributed computer networks may involve thousands of managed resources and many levels of complexity. It is known to graph the management hierarchy of such a system using a connected tree graph that extends horizontally across a display screen. As new levels are added, however, the tree becomes very hard to use because the amount of new information quickly takes up the available screen area. Management of such a system is very complex, and this task is made that much more difficult because of the inability to display the full network configuration on a single screen.

In both cases, the problem is one of optimizing the amount of the display screen that is actually being used to display information as the tree hierarchy (whether vertical or horizontal) increases in size and complexity. Techniques that display trees with large vertical extents are somewhat easy to use, but they make very poor use of the screen "real estate." On the contrary, techniques that display trees with large horizontal extents do a slightly better job of using more of the screen, but they are very hard to read and use.

Consequently, it would be highly desirable to provide an improved method and system for presenting hierarchical data within a GUI.

SUMMARY OF THE INVENTION

It is therefore a principal object of the present invention to display hierarchical data on a display screen in a more useful and intuitive manner.

It is another principal object of the invention to optimize the amount of the display screen used to display tree-based hierarchical data in a data processing system.

It is a further, more specific object of the invention to display large amounts of hierarchical node information in a useful two-dimensional format on a computer display screen.

Yet another important object of the invention is to improve the presentation of an expandable tree hierarchy on a display screen even as the complexity of the hierarchy increases.

A more general object of the invention is to enhance the presentation of graphical information displayed on a computer and to increase the ease with which such information may be manipulated by the user.

It is another more general object of the present invention to provide an improved method and system of user interface within a data processing system.

These and other objects are provided in a method and system for displaying a graphical representation on a display screen of a data processing system in a manner that optimizes screen "real estate" and ease of information viewing. The graphical representation may be a tree hierarchy, which may include a plurality of expandable and collapsible nodes. The method begins as the hierarchy is displayed within a primary display window by selecting a node to be expanded. In response, a first display region is output within the primary display window and displays a set of one or more subnodes associated with the selected node. If a first subnode in the first display region is then selected for expansion, a second display region is then output within the first display region, and the second display region in turn includes a set of one or more subnodes of the first subnode. This generation of new "nested" display regions then continues as the user continues to explore deeper into the tree hierarchy. A given subnode display region may have one or more controls, such as a sizing button or one or more scroll bars, to facilitate display of node information within the region, and preferably each expanded node remains associated with its subnode display region using some visual indicator, such as a guideline. If generation and display of a subnode display region requires additional screen space, a "parent" display region may be re-sized and/or one or more of the subnodes therein re-positioned.

Thus, according to the invention, when a node at a first level is expanded, its associated subnodes are displayed in a display region that is opened-up within a portion of the active screen. A visual indicator, such as a guideline, then continues to associate the node with the display region. Further exploration into the tree depth may be obtained by then expanding one of the subnodes in the display region. If this occurs, another display region is then opened but is "nested" within the confines of the display region that was opened when the original node was expanded. This technique takes advantage of all available screen area and yet is easy to use and manage.

The above, as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
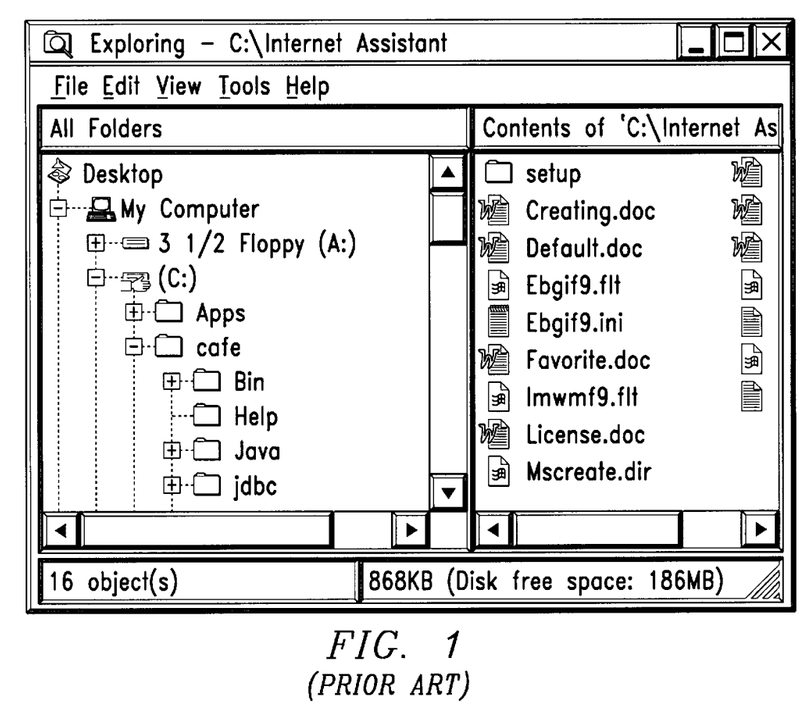
FIG. 1 is a pictorial representation of a known technique for displaying a tree hierarchy according to the prior art.

As discussed above, this invention is directed to displaying a "graphical representation" on a display screen of a data processing system in a manner that optimizes screen "real estate" and ease of information viewing. In the preferred embodiment, the graphical representation is a tree hierarchy which, as known in the art, typically includes a plurality of expandable and collapsible nodes. A representative prior art directory "tree" is illustrated in FIG. 1. As is evident, FIG. 1 shows a conventional display screen format that is output when a user runs "Windows Explorer" on a computer running the Windows '95 operating system. In the left-hand frame L, the tree hierarchy is shown with "Desktop" as the root. The "My Computer" object underlies the root. The floppy and hard disk drive drives are at the next level in the hierarchy. As can be seen, the hard disk drive (identified as the "C:" folder) includes a number of subnodes, only some of which are shown. This is because the tree's primary extent runs "vertically" and thus cannot be fully illustrated within the frame. Thus, horizontal and vertical scrollbars allow the user to move up and down, and back and forth, within the frame. As also seen in FIG. 1, each "node" of the tree typically includes an identifier, such as a name and/or icon, and optionally a bitmap having a "+" or "–" glyph. A "+" glyph indicates that the node has subnodes associated therewith but has not been expanded. A "–" glyph indicates that the node has been expanded to show its subnodes. When the user selects a node (typically by double clicking the icon), the "contents" of the selected object (e.g., the folder, directory or file, as the case may be) are then listed in the right-hand frame R. This frame typically includes a horizontal scroll bar to allow the user to move back and forth within the frame.

The remainder of this Detailed Description describes and illustrates the present invention in the context of a tree-based hierarchy of node data such as shown in FIG. 1. One of ordinary skill in the art, however, will appreciate that the teachings of the present invention are not meant to be limited to any particular graphical format (or metaphor) or data type. The invention may be practiced with any form of graphical information and data. Thus, for example, the view may represent a network of interconnected machines, a web site, a database, a file system, or any other hierarchical set of data.

Figure 2:
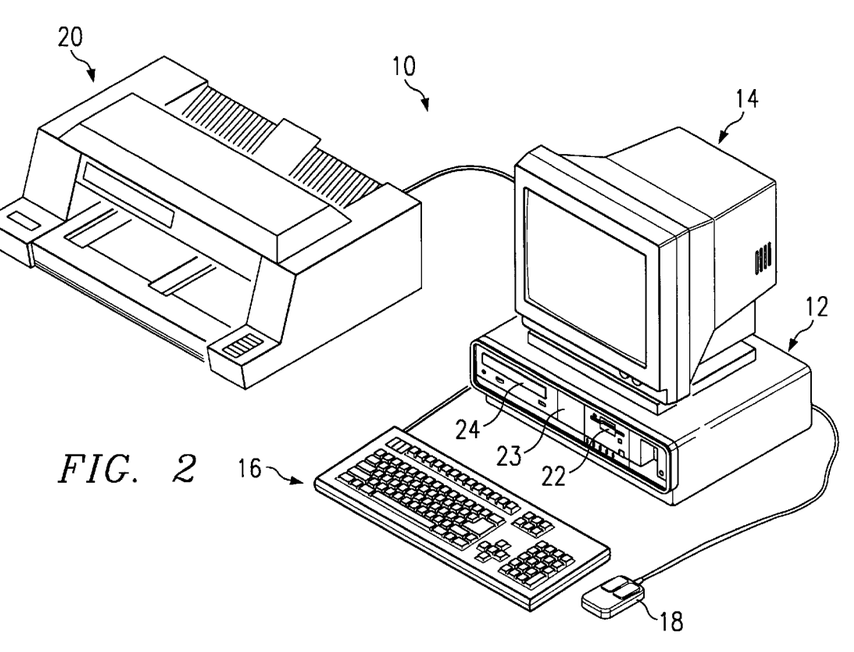
FIG. 2 is a pictorial representation of a data processing system which may be utilized to implement the method and system of the present invention.

With reference now to FIG. 2, there is first illustrated and now described a preferred embodiment of a data processing system which may be utilized to implement the method of the present invention. As illustrated, data processing system 10 includes system unit 12, display device 14, keyboard 16, mouse 18, and printer 20. As is well-known in the art, system unit 12 receives data for processing from input devices such as keyboard 16, mouse 18, or local area networking interfaces (not illustrated). Mouse 18 is preferably utilized in conjunction with a graphical user interface (GUI) in which hardware and software system objects, including data processing system components and application programs, are controlled through the selection and manipulation of associated graphical objects displayed within display device 14. Although data processing system 10 is illustrated with mouse 18, those skilled in the art will recognize that other graphical pointing devices, including a graphics tablet, stylus, light pen, joystick, puck, trackball, trackpad, and the IBM TrackPoint can also be utilized. Data processing system 10 presents output data to a user via display device 14 and printer 20. To support storage and retrieval of data, system unit 12 further includes diskette drive 22, hard disk drive 23, and CD-ROM drive 24, which are connected to system unit 12 in a well-known manner. Of course, those skilled in the art are aware that other conventional components can also be connected to system unit 12.

Figure 3:
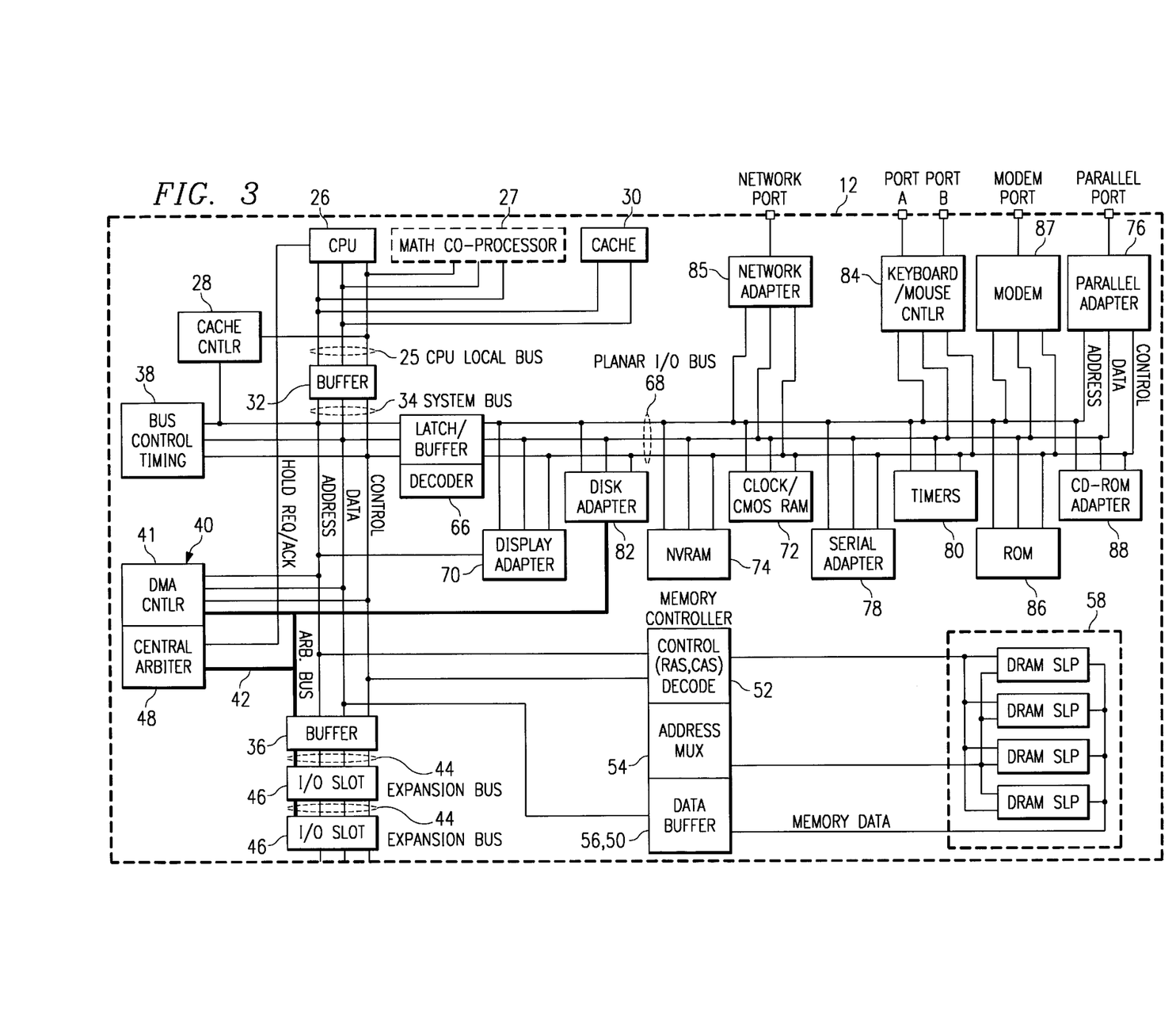
FIG. 3 depicts a block diagram of the system unit of the data processing system illustrated in FIG. 2.

Referring now to FIG. 3, there is depicted a block diagram of the principal components of system unit 12 of data processing system 10. As illustrated, system unit 12 includes a central processing unit (CPU) 26 which executes software instructions. While any appropriate microprocessor can be utilized for CPU 26, CPU 26 is preferably one of the PowerPC line of microprocessors available from IBM Microelectronics. Alternatively, CPU 26 can be implemented as one of the 80×86 or higher microprocessors, which are available from a number of vendors. In addition to CPU 26, an optional math coprocessor 27, cache controller 28, and cache memory 30 are coupled to high-speed CPU local bus 25. Math coprocessor 27 is an optional processor, distinct from CPU 26, that performs mathematic computations with greater efficiency than CPU 26. Math coprocessor 27 is optional since the performance advantage provided by a math coprocessor may be achieved by enhancements to CPU 26, such as the implementation of multiple floating-point execution units. Cache memory 30 comprises a small high-speed memory which stores frequently accessed data and instructions. The operation of cache 30 is controlled by cache controller 28, which maintains a directory of the contents of cache 30 and enforces a selected cache coherency protocol.

CPU local bus 25 is coupled to buffer 32 to provide communication between CPU local bus 25 and system bus 34, which extends between buffer 32 and a further buffer 36. System bus 34 is connected to bus control and timing unit 38 and direct memory access (DMA) unit 40, comprising central arbiter 48 and DMA controller 41. DMA controller 41 supports memory accesses that do not involve CPU 26. Direct memory accesses are typically employed to transfer data directly between RAM 58 and an "intelligent" peripheral device, such as disk adapter 82. DMA requests from multiple peripheral devices are arbitrated by central arbiter 48. As described below, central arbiter 48 also regulates access to devices coupled to expansion bus 44 by control signals transmitted via arbitration control bus 42.

CPU 26 accesses data and instructions from and stores data to volatile random access memory (RAM) 58 through memory controller 50, which comprises memory control unit 50, address multiplexer 54, and data buffer 56. Memory control unit 52 generates read enable and write enable signals to facilitate storage and retrieval of data and includes address translation facilities that map virtual addresses utilized bar CPU 26 into physical addresses within RAM 58. As will be appreciated by those skilled in the art, RAM 58 comprises a number of individual volatile memory modules which store segments of operating system and application software while power is supplied to data processing system 10. The software segments are partitioned into one or more virtual memory pages which, each contain a uniform number of virtual memory addresses. When the execution of software requires more pages of virtual memory that can be stored within RAM 58, pages that are not currently needed are swapped with the required pages, which are stored within nonvolatile storage devices 22–24.

Memory controller 50 further includes address multiplexer 54, which selects particular addresses within RAM 58, and data buffer 56, which buffers data read from and stored to RAM 58. Memory controller 50 also provides memory protection that isolates system processes and user processes within the virtual address space allocated to each process. Thus, a program running in user node can access only memory allocated to its virtual address space; the user mode program cannot access memory within another process's virtual address space unless memory sharing between the processes is supported and the program has the appropriate privileges for the access.

Still referring to FIG. 3, buffer 36 provides an interface between system bus 34 and expansion bus 44. Connected to expansion bus 44 are a number of I/O slots 16 for receiving adapter cards which may be further connected to an I/O device or memory. Arbitration control bus 42 couples DMA controller 41 and central arbiter 48 to I/O slots 46 and disk adapter 82. By implementing a bus arbitration protocol, central arbiter 48 regulates access to expansion bus 44 by extension cards, controllers, and CPU 26. In addition, central arbiter 48 arbitrates for ownership of expansion bus 44 among the bus masters coupled to expansion bus 44. Bus master support allows multiprocessor configurations expansion bus 44 to be created by the addition of bus master adapters containing a processor and its support chips.

System bus 34 is coupled to planar I/O bus 68 through buffer 66. Attached to planar I/O bus 68 are a variety of I/O adapters and other peripheral components, including display adapter 70, disk adapter 82, nonvolatile RAM 74, clock 72, serial adapter 78, timers 80, read only memory (ROM) 86, CD-ROM adapter 88, keyboard/mouse controller 84, network adapter 85, modem 87, and parallel adapter 76. Display adapter 70 translates graphics data from CPU 26 into R, G, and B video signals utilized to drive display device 14. Depending upon the operating system and application software running, the visual output may include text, graphics, animation, and multimedia video. Disk adapter 82 controls the storage of data to and the retrieval of data from hard disk drive 24 and diskette drive 22. Disk adapter 82 handles tasks such as positioning the read/write heads within drives 22 and 23 and mediating between drives 22 and 23 and CPU 26. Nonvolatile RAM 74 stores system configuration data that describes the present configuration of data processing system 10. For example, nonvolatile RAM 74 contains information that describes the capacity of hard disk drive 24 or a diskette placed within diskette drive 22, the type of display device 14, the amount of free RAM 58, and the present system configuration. These data remain stored in nonvolatile RAM 74 when power is removed from data processing system 10.

Clock 72 is utilized by application programs executed by CPU 26 for time of day calculations. Serial adapter 78 provides a synchronous or asynchronous serial interface which enables data processing system 10 to communicate with a remote data processing system or peripheral device. Serial communication is governed by a serial communication protocol such as RS-232, RS-422, or the like. Timers 80 comprise multiple interval timers which may be utilized by application or operating system software to time one or more selected events within data processing system to ROM 86 typically stores a basic input/output system (BIOS) which provides user-transparent I/O when CPU 26 is operating under the DOS operating system. BIOS also includes power on self-test (POST) diagnostic routines which perform system set up at power on. For example, POST interrogates hardware, allocates a BIOS data area (BDA), constructs an interrupt vector table to point to interrupt handling routines within ROM 86, and initializes timers 80, clock 72 and other devices within system unit 12. CD-ROM adapter 88 interfaces CD-ROM drive 24 with planar I/O bus 34 to support retrieval of data from an optical disk loaded within CD-ROM drive 24. Keyboard/mouse controller 84 interfaces system unit 12 with keyboard 16 and a graphical pointing device such as mouse 18. As will be described in greater detail below, keyboard/mouse controller 84 receives a serial signal from mouse 18 that indicates each incremental displacement of mouse 18.

Finally, system unit 12 includes network adapter 85, modem 87, and parallel adapter 76, which facilitate communication between data processing system 10 and peripheral devices or other data processing systems. Network adapter 85 is utilized to connect data processing system 10 to an unillustrated local area network (LAN). A LAN provides a user of data processing system 10 with a means of electronically communicating information, including software, with a remote computer or a network logical storage device. Additionally, LAN supports distributed processing, which enables data processing system 10 to share a task with other data processing systems linked to the LAN. Modem 87 supports communication between data processing system 10 and another data processing system over a standard telephone line. For example, modem 87 may be utilized to connect data processing system 10 to an on-line information service, such as America OnLine, Prodigy or CompuServe. Such on-line service providers frequently offer software that can be downloaded into data processing system 10 via modem 87. Furthermore, through modem 87, data processing system 10 can access other sources of software, such as a server, an electronic bulletin board, and the Internet or World Wide Web. Parallel port 76 transmits printer control signals and output data to printer 20 through a parallel port.

As is typical of many data processing systems, following power-on, the various hardware components of data processing system 10 will each execute its own internal reset procedures to regain a stable, known state. At the completion of these reset procedures, CPU 26 will execute POST code within ROM 86 to initialize system hardware, setup the BIOS data area, and construct and interrupt vector table, as well as other tasks. Following POST, a "boot strap" or primary operating system loader is run to load segments of an operating system (OS) 100 (see FIG. 3) into RAM 58 and launch execution of OS 100, which in a preferred embodiment of the present invention comprises OS/2 Warp, available from IBM Corporation.

Figure 4:
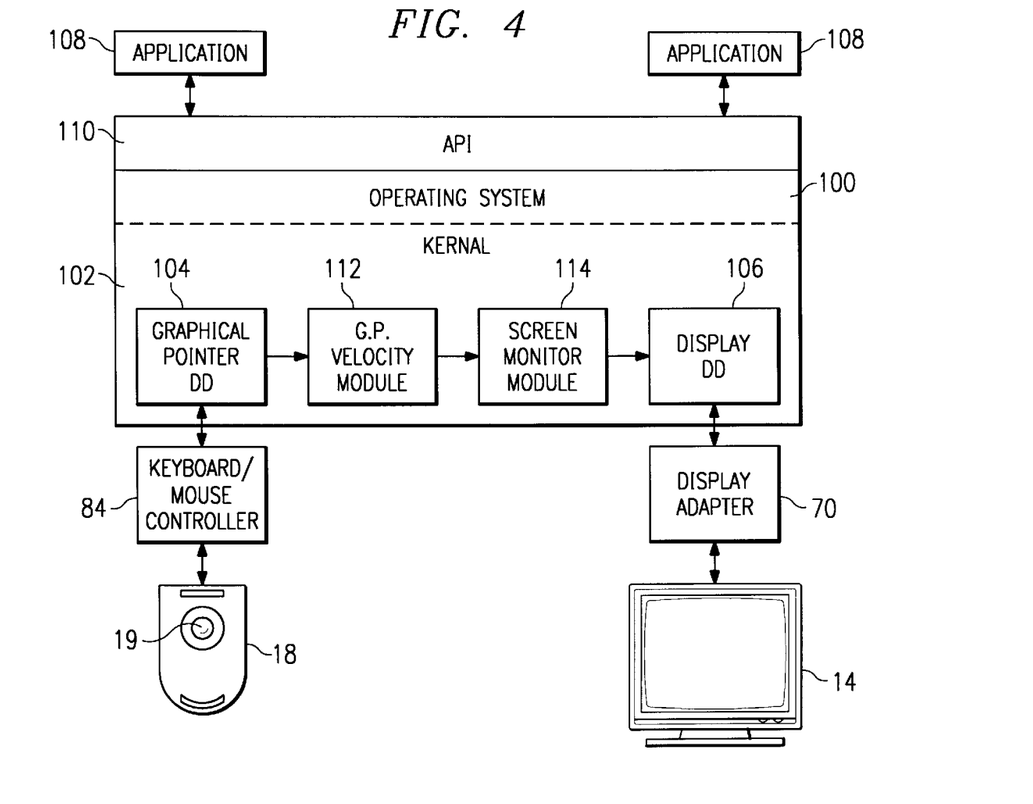
FIG. 4 illustrates a conceptual diagram of the interaction between a graphical pointing device, the software configuration utilized by the present invention, and a display device.

With reference now to FIG. 4, there is illustrated a pictorial representation of the software configuration of data processing system 10 following power-on. As depicted, the software configuration of data processing system 10 comprises OS 100, which includes kernel 102, and one or more applications 108, which communicate with OS 100 through Application Programming Interface (API) 110. Kernel 102 comprises the lowest level of OS 100 that controls the operation of the hardware components of data processing system 10 through device drivers, such as graphical pointer device driver 104 and display device driver 106.

As illustrated, graphical pointer device driver 104 and display device driver 106 communicate with keyboard/mouse controller 84 and display adapter 70, respectively, to support the interconnection of mouse 18 (illustrated in a bottom view) and display device 14 with data processing system 10. In response to movement of trackball 19 of mouse 18, mouse 18 transmits an analog graphical pointer signal to keyboard/mouse controller 34 that describes the direction and rotation of trackball 19. Keyboard/mouse controller 84 digitizes the analog graphical pointer signal and transmits the digitized graphical pointer signal to graphical pointer device 10 driver 104, which thereafter interprets the digitized graphical pointer signal and routes the interpreted graphical pointer signal to graphical pointer velocity module 112 within kernel 102. Graphical pointer velocity module 112 modifies the interpreted graphical pointer signal to retard or accelerate the rate of movement of the graphical pointer manipulated utilizing mouse 18. Graphical pointer velocity module then passes the modified and interpreted graphical pointer signal to screen monitor module 114, which performs GUI actions based on the position of the graphical pointer within display device 14. For example, screen monitor module 114 causes a window to surface within a GUI in response to a user selection of a location within the window. Finally, the graphical pointer signal is passed to display device driver 106, which routes the data within the graphical pointer signal and other display data to display adapter 70, which translates the display data into the R, G, and B signals utilized to drive display device 14. Thus, the movement of trackball 19 of mouse 18 results in a corresponding movement of the graphical pointer displayed within display device 14.

Figure 5:
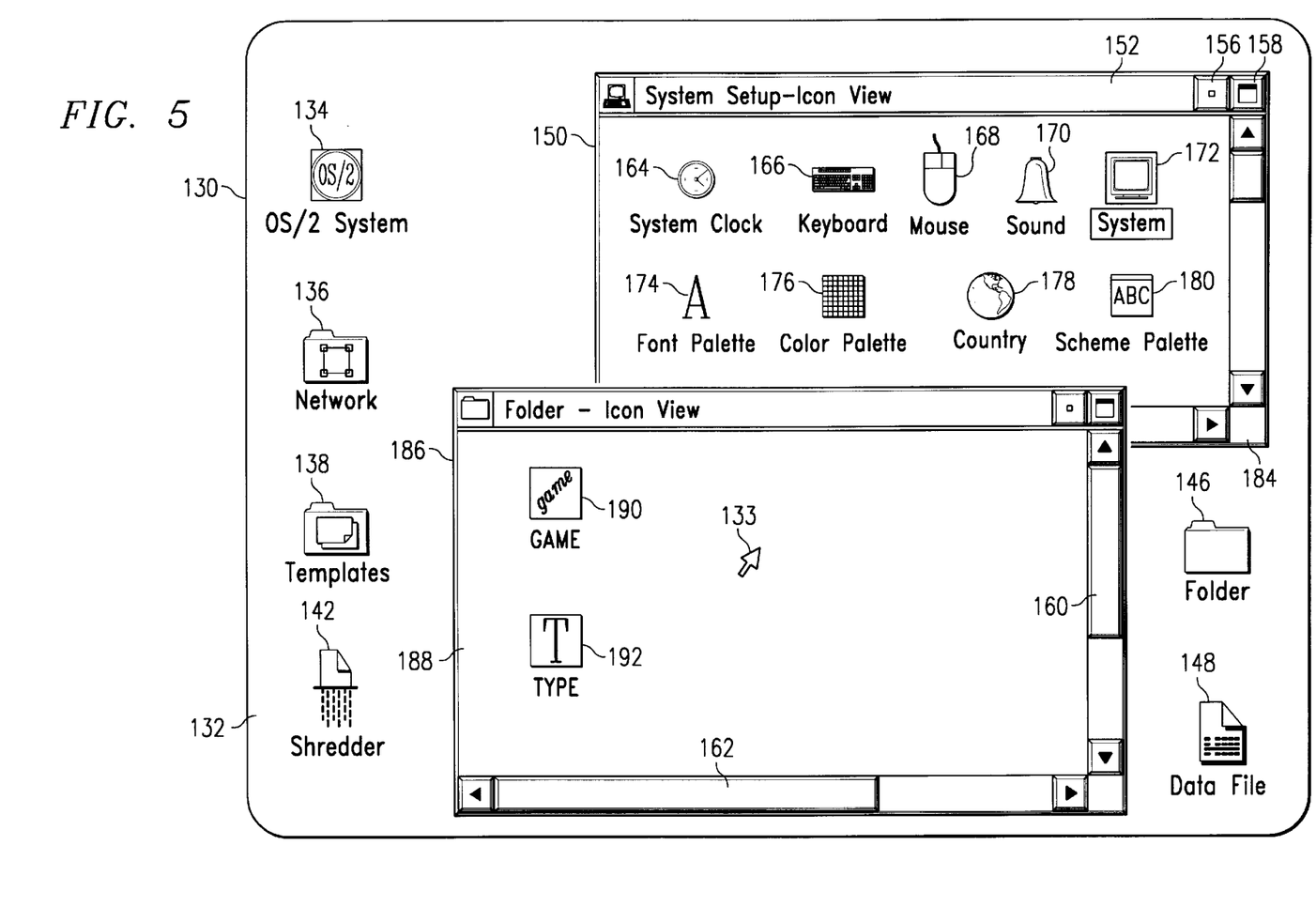
FIG. 5 depicts a pictorial representation of a desktop displayed within the display device of the data processing system illustrated in FIG. 2.

Referring now to FIG. 5, there is depicted a preferred embodiment of the graphical user interface (GUI) employed by OS 100. Screen 130 displayed to a user within display device 14 includes a background desktop 132 upon which a plurality of user-selectable icons 134–148 are usually displayed. The area within the desktop 132 defines an active area of the display screen which may be useful for displaying a graphical representation, as will be described below. Each icon 134–148 represents an program, function, or file storage area, which a user can conveniently select utilizing graphical pointer 133 by double-clicking the left button of mouse 18. When a user selects one of icons 134–148, the function corresponding to the selected icon is activated and the selected icon is highlighted. Many of icons 134–148 have an associated window or series of windows that are displayed when the icon is selected. For example, when OS/2 System icon 134 is selected, window 150 is displayed to the user to provide further possible selections (i.e. icons 164–180).

It is now assumed that the user has selected one of the icons 134–148 to cause a display of the file system for one of the storage devices of the computer. It is further assumed that the file system is organized in the form of a tree hierarchy comprising a root directory, a plurality of parent directories, and one or more files in each parent directory. The present invention provides a mechanism for presenting this expandable tree hierarchy in a much more convenient to use and informative manner as compared to the prior art.

Figure 6A:
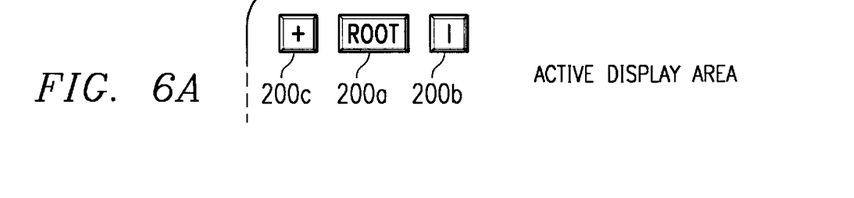
FIGS. 6A–6D illustrate various display screens generated as a user advances deeper into the tree hierarchy according to the display techniques of the present invention.
Figure 6B:
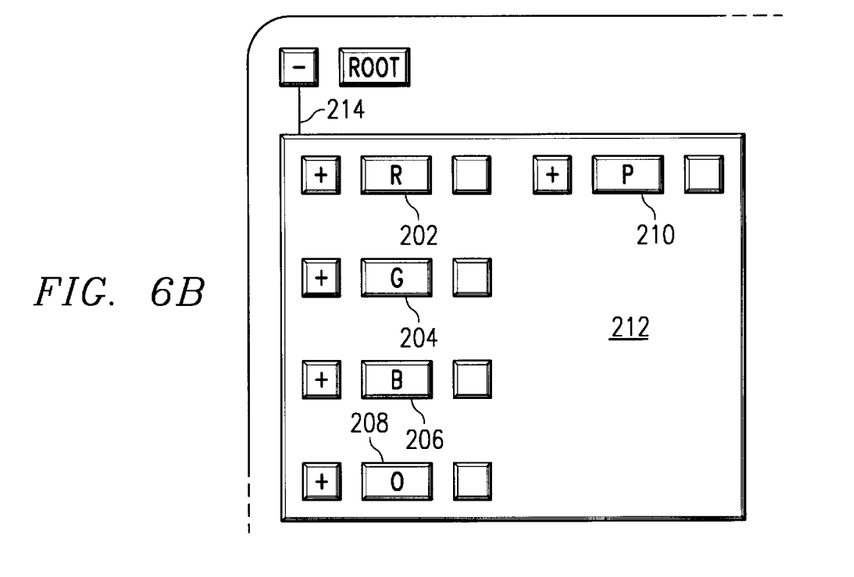

FIGS. 6A–6D illustrate the basic mechanism of the present invention as the various levels within an expandable tree structure are explored. The operations that are now illustrated and described are preferably implemented using software instructions executed under the control of the OS 100. It is assumed at the outset that the tree structure includes a plurality of nodes, some of which include subnodes. The tree is organized in a hierarchy starting with a root and including a plurality of branches, some of which further extensions or "leaves." The particular organizational structure of the tree is not a limiting factor in the invention as previously discussed. In FIG. 6A, the active area of the display screen includes a single node 200 identifying the root of the tree. Preferably, the root node is displayed whenever it is desired to first explore the tree. As can be seen in FIG. 6A, root node 200 includes an identifier 200*a,* an icon 200*b,* and a bitmap 200*c*. The bitmap includes a glyph "+" indicating that the node has subnodes associated therewith but has not yet been expanded. When the user moves the graphical display pointer and then clicks on the icon or identifier, a display region or subwindow associated with the selected node (in the case, the root) is then opened up within the active areas of the display screen. This is illustrated in FIG. 6B.

In particular, assume that the root includes five (5) subnodes associated therewith. These subnodes, identified as 202, 204, 206, 208 and 210, are then displayed within a first display region 212. It should be appreciated that first display region 212 is located within the confines of the active display, and this region remains associated with the node that "spawned" it via a guideline 214 or similar visual indication. Preferably, the guideline extends between the bitmap 200*c,* which in FIG. 6B includes a "–" glyph since the node has been expanded, and the border of the display region 212. The association of the node and the display region may be made using other graphic techniques besides or in addition to a guideline, such as highlighting the associated elements in the same color or using similar typestyles for text elements. As can be seen, each subnode or "child" within the first display region 212 that has subnodes associated therewith likewise includes a bitmap with a "+" glyph. The particular size or configuration of the first display region 212 is not particularly important as long as it is large enough and/or configured appropriately to display the subnodes associated with the parent node. Likewise, the particular positioning or layout of the subnodes 202–210 is not critical. Also, while the "border" of the display region is illustrated as being discernible, it should be appreciated that this border may be virtual in the sense that it is not readily visible to the user.

Figure 6C:
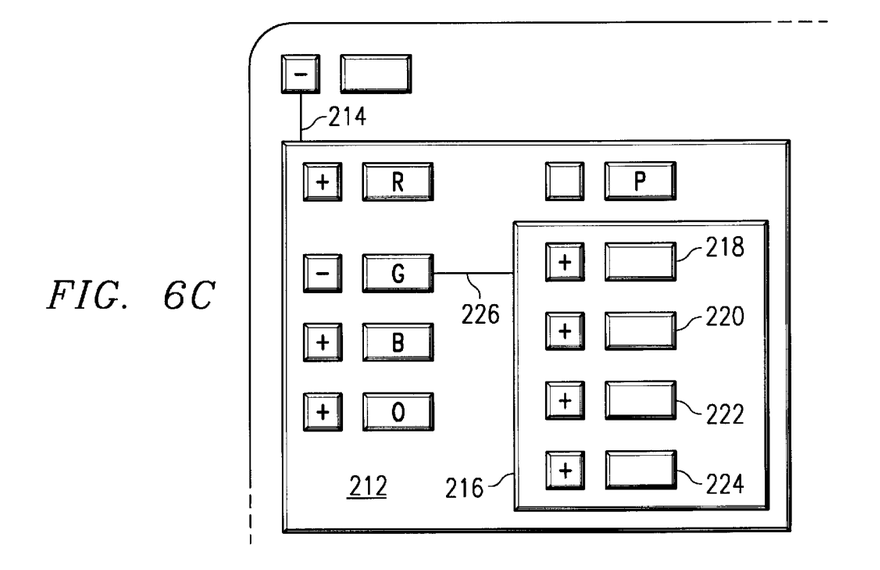

FIG. 6C illustrates what happens when the user moves the graphical display pointer and then clicks on subnode 204 within the first display region 212. As can be seen, this causes the creation of a second display region or subwindow 216, in which a plurality of subnodes associated with the (sub)node 204 are then displayed. In particular, while node 204 is a "subnode" relative to its parent node 200, the same node 204 is a parent to the child nodes 218, 220, 222 and 224 in the new display window. According to the invention, the second display region 216 is preferably "nested" within the confines of the first display region, as opposed to overlaying or overlapping part of the parent frame. If necessary, and if the active screen area permits, the first display region 212 may be enlarged before or upon generation of the second display region 216. Alternatively, the first display region 212 may simply be opened initially with sufficiently large enough area in which to accommodate the second (and any subsequent) display regions nested therein. The border of second display region may be visible or virtual. As also seen in FIG. 6C, the second display region 216 remains visually associated with its parent node 204 through the guideline 226. Guideline 214, which associates the root node 200 to the first display region 212, remains persistent on the screen as well.

Figure 6D:
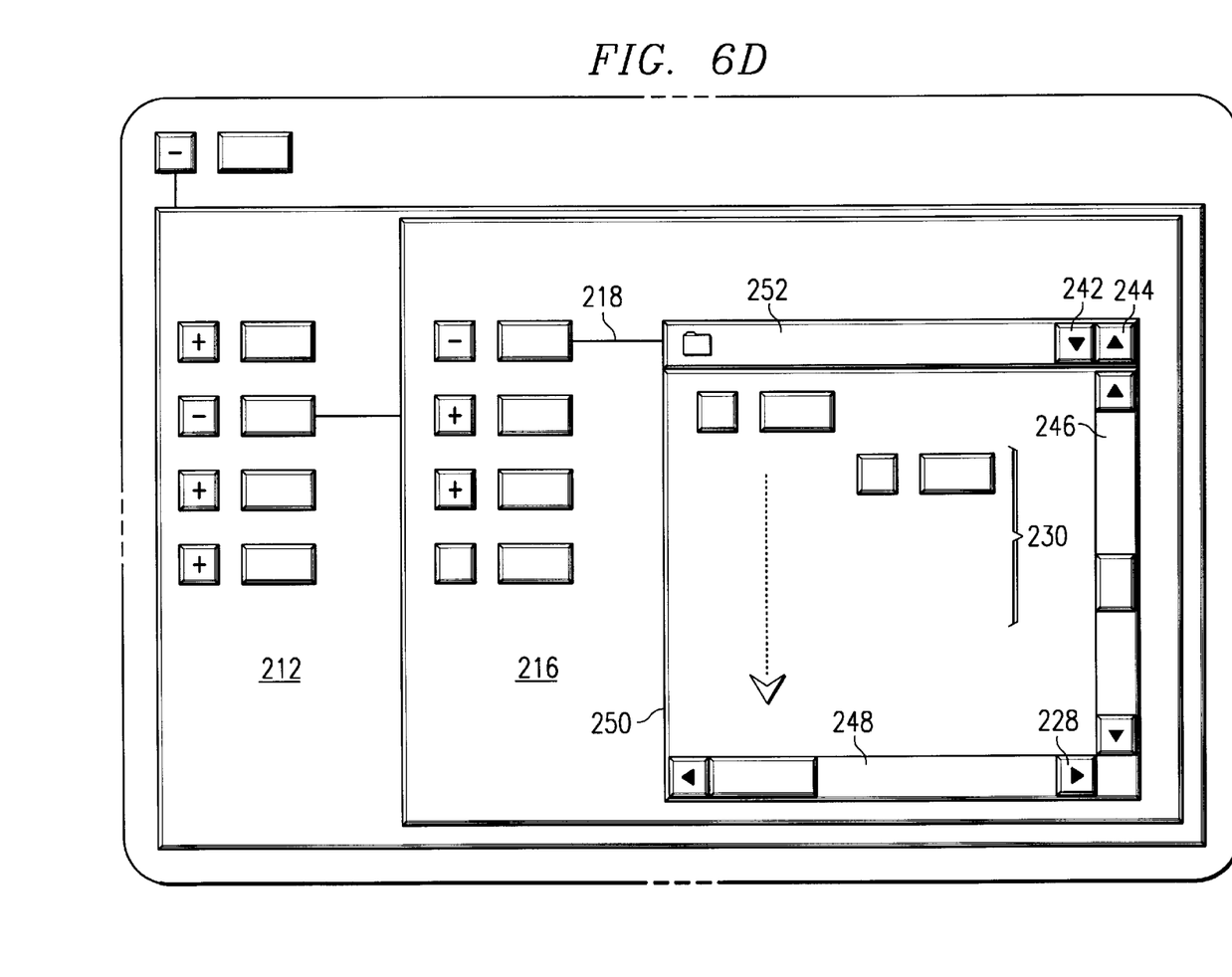

In FIG. 6D, the user has clicked on subnode 218 in the second display region 216, thus spawning yet another display region 228 in which a large number of additional subnodes 230 are displayed. As is evident, this third display region or subwindow 228 is nested within the confines of the second display region 216 which, as noted above, may be enlarged dynamically to accommodate the new region if necessary. Because the third display region 228 includes a large number of objects, it may be desirable to include one or more controls to facilitate navigation within the region. To this end, display region may include shrink and grow buttons 242 and 244, which are utilized to minimize (close) or maximize (set to full screen size) the window, vertical and horizontal scroll bars 246 and 248, respectively, to enable a user to scroll through the contents of the corresponding window, and resizing box 250, which enables a user to resize the windows utilizing drag-and-drop techniques. The display region 228 may also include a title bar 252, which identifies the contents of the display region. Although only the third display region 228 is shown with these controls, one of ordinary skill will appreciate that any one of the display regions may include some or all of them as well. Preferably, the controls are only provided when the display region includes a sufficiently large number of objects therein that cannot be reasonably managed within the confines of the region.

Preferably, a subwindow displayed within a parent window is re-positionable within the parent frame using conventional window control mechanisms. A subwindow, however, generally will not be allowed to overlap its parent frame, although a pair of subwindows at the same level may overlap.

Figure 7:
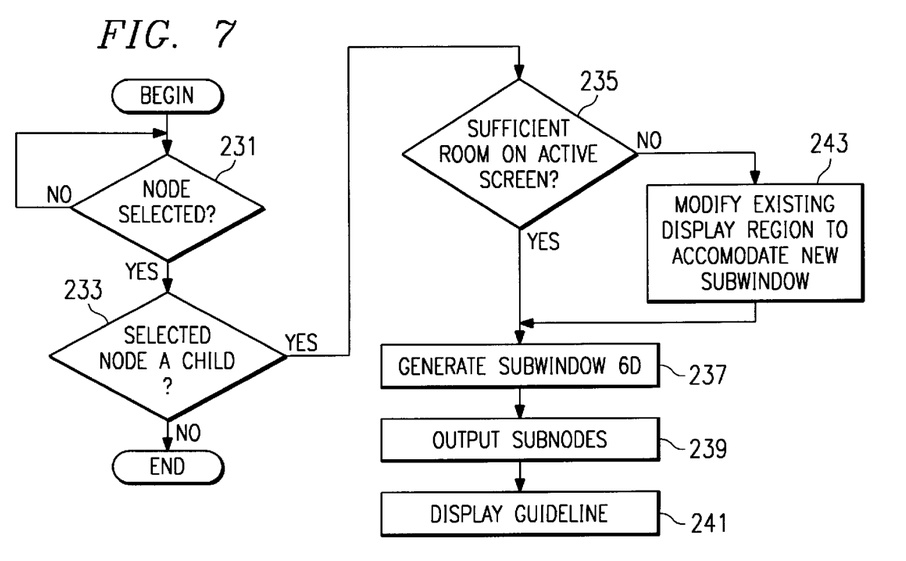
FIG. 7 is a flowchart showing the control logic used by the invention to generate the nested display areas.

FIG. 7 is a portion of a logic flowchart describing how a pair of "nested" display subwindows such as shown in FIGS. 6B–6C is generated. In particular, this routine illustrates a method of displaying a tree hierarchy on a fixed region of a display screen in a data processing system, with the tree hierarchy defined by a set of expandable and collapsible nodes. The method begins at step 231 to test for selection of a node to be expanded. If the outcome of the test at step 231 is negative, the routine cycles. If, however, the outcome of the test at step 231 indicates that a node has been selected for enlargement, the routine continues at step 233 to test whether the node is a child node located within a display region already present on the screen. If the outcome of the test at step 233 is positive, a new display region or subwindow needs to be opened up within the confines of the existing display region. In this case, the routine branches to step 235 to first test whether there is sufficient room in the existing display region to open up the subwindow. If the outcome of the test at step 235 is positive, the routine continues at step 237 and generates the subwindow. At step 239, the subnodes associated with the selected node are output in the subwindow and, at step 241, the guideline is displayed. Steps 237, 239 and 241 may be performed concurrently. If, however, the outcome of the test at step 235 is negative, the routine first carries out step 243 to modify the existing display region to accommodate the new subwindow. Step 243 may involve enlarging the existing region, re-positioning one or more screen elements in the region, and the like. Thereafter, the routine returns to steps 237, 239 and 241 as previously described to generate the subwindow, its contents and the guideline. If the outcome of the test at step 233 is negative, however, the node to be expanded is either an upper level node or a same level node that does not require a nested subwindow. The subroutine thus terminates.

Figure 8A:
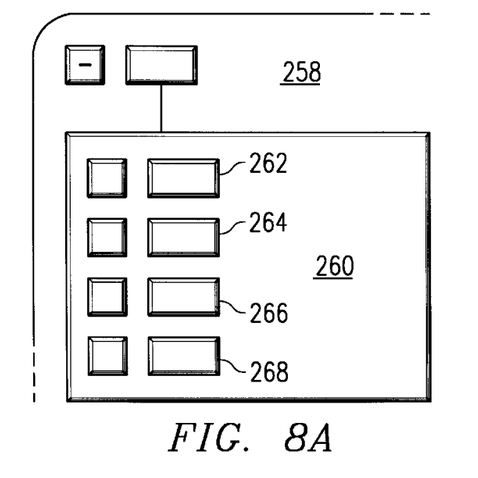
FIGS. 8A–8C illustrate various display screens generated as a user expands multiple nodes within the same level of the tree hierarchy.
Figure 8B:
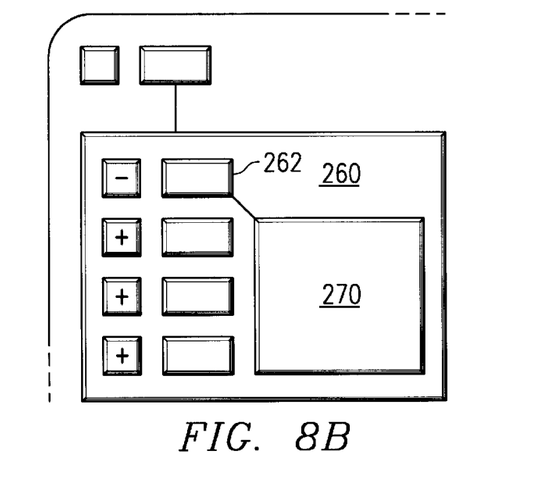
Figure 8C:
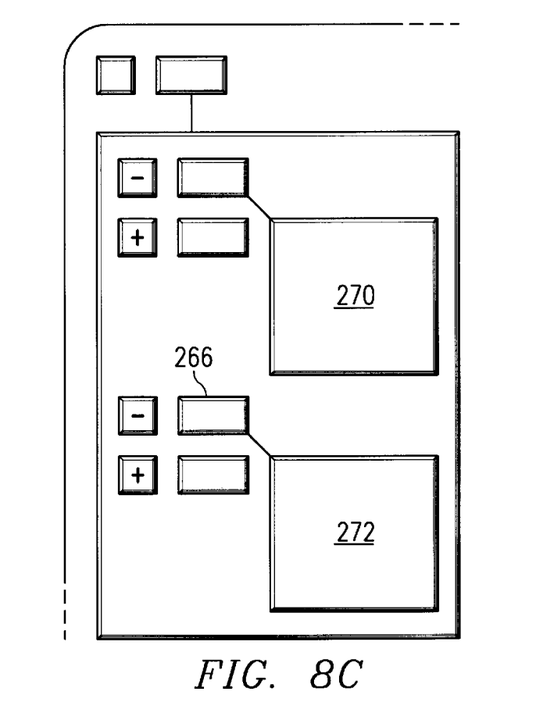

As can be seen, a new "nested" display region is thus generated as the user moves deeper into the hierarchy. If, however, the user merely expands a second node within the same level, a new display region is opened for the second node. This region, however, is not nested within other display regions at the same "depth." This is illustrated in FIGS. 8A–8C. In FIG. 8A, the root 258 of the tree has spawned a first display region or area 260 having four (4) subnodes 262, 264, 266 and 268 associated therewith. If the user then expands node 262, the display region 270 is generated as seen in FIG. 8B. Display region 270 may overlap one or more of the other remaining subnodes in the parent frame 260. Suppose then that the user then expands node 266, which is at the same level as node 262. The result is illustrated in FIG. 8C. As can be seen, this operation spawns a second display region 272, but this region is not confined within the first display region as the nodes 262 and 266 are at the same level within the hierarchy. Region 272 may overlap region 270 since the areas are within the same level of the hierarchy.

Figure 9A:
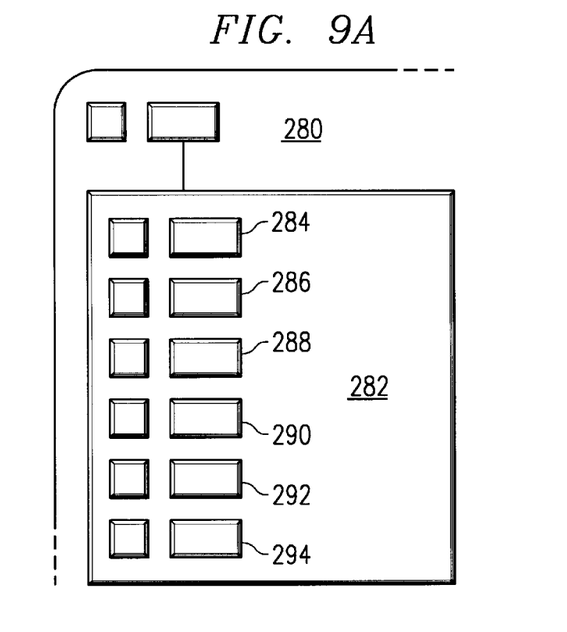
FIGS. 9A–9B illustrate various display screens generated by the methods of the present invention showing how certain display elements are re-positioned as necessary to accommodate generation or enlargement of new window regions.
Figure 9B:
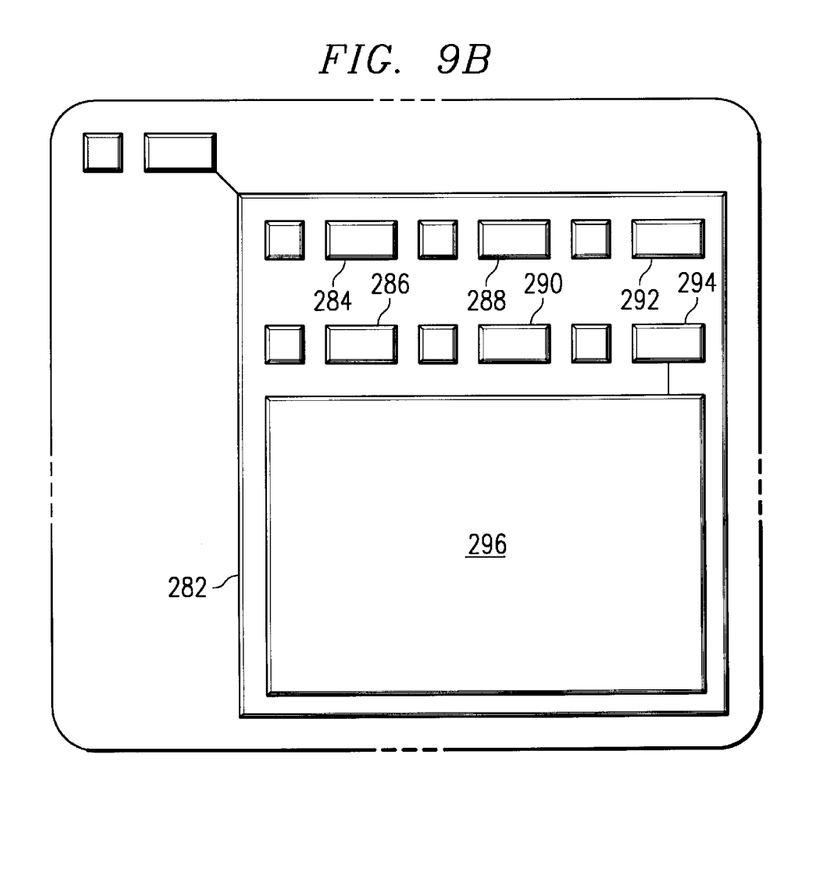

When necessary, and as noted above in the flowchart of FIG. 7, layout of the nested display regions and/or the position of subnodes within a particular display region may be adjusted to accommodate new display information. This is illustrated in FIGS. 9A–9B. In FIG. 9A, the root node 280 has been expanded to generate a first display region 282 having a plurality of subnodes 284, 286, 288, 290, 292 and 294. It is assumed that subnode 294 is parent to a relatively large number of subnodes. Thus, when the user then expands node 294, a relatively large second display region 296 is then opened as illustrated in FIG. 9B. Because of the size of the second display region, at least some of the subnodes 284–292 have been re-positioned to accommodate the new window. Although all of the above subnodes are still visible, it should be appreciate that one or more of them might be hidden by the second display region. In such case, a window management routine may be used to allow the user to toggle back and forth between the overlapping windows. Likewise, if the second display region has controls, the user may enlarge this region. This may also cause re-positioning of the subnodes or perhaps a new screen layout to thereby accommodate dynamic screen modifications or adjustments.

The present invention provides significant advantages over the prior art, wherein tree hierarchies are typically displayed as essential "one-dimensional" vertical or horizontal representations. By generating a new "nested" display region or subwindow within the confines of an existing display region, the invention enforces a visual association between a node and its associated subnodes. As the user explores deeper into the tree, the hierarchical relationships between the nodes is maintained, yet the user is able to easily visualize and manipulate tree elements. The display technique takes full advantage of all available display screen "real estate," thus providing a much more effective and easy to manage display of the tree data. Where necessary, subwindows may be provided with appropriate window management controls. The invention has broad applicability for the display of graphical data, such as a file directory tree, a network of connected, managed machines, hypertext documents in a web site, and so on.

The aspects of the present invention pertain to specific "method" steps implementable on computer systems. In an alternate embodiment, the invention may be implemented as a computer program product for use with a computer system. Those skilled in the art should readily appreciate that programs defining the functions of the present invention can be delivered to a computer in many forms, which include, but are not limited to: (a) information permanently stored on non-writable storage media (e.g., read only memory devices within a computer such as ROM 86 or optical disks readable by CD-ROM drive 24); (b) information alterably stored on writable storage media (e.g., floppy disks within diskette drive 22 or hard disk drive 24); or (c) information conveyed to a computer through communication media, such as through a computer or telephone network. It should be understood, therefore, that such media, when carrying computer readable instructions that direct the method functions of the present invention, represent alternate embodiments of the present invention.

While the invention has been particularly shown and described with reference to a preferred embodiment, it will be understood by those skilled in the art that various changes in form and detail may be made therein without departing from the spirit and scope of the invention.

What is claimed is:

1. A method for display of graphical information on a display screen of a data processing system, the display of graphical information including a plurality of nodes representing a hierarchy, wherein at least some of the nodes include subnodes, comprising the steps of:

selecting a node to be expanded as the hierarchy is displayed within a primary display window on the display screen;

outputting within the primary display window a first display window in which a set of one or more subnodes associated with the selected node are displayed;

responsive to selecting a first subnode to be expanded as the set of one or more subnodes are displayed within the first display window, outputting within the first display window a second display window in which a set of one or more subnodes of the first subnode are displayed; and re-positioning at least some of the set of one or more subnodes in the first display window if necessary to accommodate the second display window within the first display window.

2. The method as described in claim 1 further including the step of:

displaying a visual indicator associating the node and the first display window.

3. The method as described in claim 2 wherein the visual indicator is a guideline.

4. The method as described in claim 1 further including the step of:

displaying a visual indicator associating the first subnode and the second display window.

5. The method as described in claim 4 wherein the visual indicator is a guideline.

6. The method as described in claim 1 wherein at least one of the first and second display windows includes a scroll bar.

7. The method as described in claim 6 wherein at least one of the first and second display windows includes a resizing button.

8. The method as described in claim 1 wherein the graphical information represents a file system of a given storage device of the data processing system.

9. A method for display of graphical information on a display screen of a data processing system, the display of graphical information including a plurality of nodes representing a tree hierarchy, wherein at least some of the nodes include subnodes, comprising the steps of:

selecting a node to be expanded as the tree hierarchy is displayed within a primary display window on the display screen;

outputting within the primary display window a first display window in which a set of one or more subnodes associated with the selected node are displayed;

displaying a guideline associating the selected node and the first display window;

responsive to selecting a first subnode to be expanded as the set of one or more subnodes are displayed within the first display window, outputting within the first display window a second display window in which a set of one or more subnodes of the first subnode are displayed;

displaying a guideline associated the selected first subnode and the second display window; and re-positioning at least some of the set of one or more subnodes in the first display window if necessary to accommodate the second display window.

10. The method as described in claim 9 wherein the tree hierarchy represents a network of interconnected machines.

11. The method as described in claim 10 wherein the selected node is a management resource in the network and the set of one or more subnodes associated with the selected node represent machines managed by the management resource.

12. A computer program product within a computer readable media for causing a data processing system to display graphical information on a display screen, the display of graphical information including a plurality of nodes representing a tree hierarchy, wherein at least some of the nodes include subnodes, said computer program product comprising:

instruction means, responsive to selection of a node to be expanded as the hierarchy is displayed within a primary display window on the display screen, for outputting within the primary display window a first display window in which a set of one or more subnodes associated with the selected node are displayed;

instruction means, responsive to selection of a first subnode to be expanded as the set of one or more subnodes are displayed within the first display window, for outputting within the first display window a second display window in which a set of one or more subnodes of the first subnode are displayed; and means, responsive to selection of the first subnode to be expanded, for re-positioning at least some of the set of one or more subnodes in the first display window if necessary to accommodate the second display window.

13. The computer program product as described in claim 12 further including instruction means for displaying a visual indicator associating a selected node and a display region.

14. The computer program product as described in claim 12 further including instruction means to control scrolling of subnode data within at least one of the first and second display windows.

15. The computer program product as described in claim 12 further including instruction means to control resizing of at least one of the first and second display windows.

16. A data processing system, comprising:

a processor;

an operating system;

a display device for display of graphical information on a display screen, the display of graphical information including a plurality of nodes representing a tree hierarchy, wherein at least some of the nodes include subnodes; and a control program run by the operating system for controlling display of the graphical information, the control program comprising:

instruction means, responsive to selection of a node to be expanded as the hierarchy is displayed within a primary display window on the display screen, for outputting within the primary display window a first display window in which a set of one or more subnodes associated with the selected node are displayed;

instruction means, responsive to selection of a first subnode to be expanded as the set of one or more subnodes are displayed within the first display window, for outputting within the first display window a second display window in which a set of one or more subnodes of the first subnode are displayed: and means, responsive to selection of the first subnode to be expanded, for re-positioning at least some of the set or one or more subnodes in the first display window if necessary to accommodate the second display window within the first display window.

17. The data processing system as described in claim 16 wherein the control program further includes means for displaying a visual indicator associating a selected node and a display region. for re-positioning at least some of the set of one or more subnodes in the first display region.

18. The data processing system as described in claim 16 further including means to control scrolling of subnode data within at least one of the first and second display windows.

19. The data processing system as described in claim 16 further including instruction means to control resizing of at least one of the first and second display windows.

20. The data processing system as described in claim 16 wherein the tree hierarchy represents a file system associated with a storage device of the data processing system.

21. The data processing system as described in claim 20 wherein the selected node is a directory of the file system and the set of one or more subnodes associated with the selected node represent files in the directory.

22. A method of displaying a tree hierarchy in a window of a display screen in a data processing system, the tree hierarchy defined by a set of expandable and collapsible nodes, comprising the steps of:

in response to selection of a node to be expanded, generating a first subwindow within the window showing subnodes associated with the selected node;

in response to selection of a subnode within the first subwindow, generating a second subwindow nested within the first subwindow and showing subnodes associated with the selected subnode of the first subwindow;

in response to selection of a subnode within the second subwindow, generating a third subwindow nested within the second subwindow and showing subnodes associated with the selected subnode of the second subwindow; and without user input, automatically repositioning at least some of the subnodes if necessary to accommodate a subwindow.

\* \* \* \* \*